US011036789B2

(12) United States Patent
Hussain et al.

(10) Patent No.: US 11,036,789 B2
(45) Date of Patent: Jun. 15, 2021

(54) COMPUTER VISION NEURAL NETWORK SYSTEM

(71) Applicant: Algomus, Inc., Troy, MI (US)

(72) Inventors: Amjad Hussain, Bloomfield Hills, MI (US); Taleb Alashkar, Royal Oak, MI (US); Vijay Gunasekaran, Royal Oak, MI (US)

(73) Assignee: AlgoFace, Inc., Carefree, AZ (US)

( * ) Notice: Subject to any disclaimer, the term of this patent is extended or adjusted under 35 U.S.C. 154(b) by 177 days.

(21) Appl. No.: 16/565,046

(22) Filed: Sep. 9, 2019

(65) Prior Publication Data

US 2020/0082154 A1 Mar. 12, 2020

Related U.S. Application Data

(60) Provisional application No. 62/729,194, filed on Sep. 10, 2018.

(51) Int. Cl.
*G06F 16/583* (2019.01)
*G06K 9/62* (2006.01)
*G06F 40/20* (2020.01)
*G06T 7/10* (2017.01)
*G06F 17/16* (2006.01)
*G06K 9/00* (2006.01)
*G06N 3/04* (2006.01)

(52) U.S. Cl.
CPC ............ *G06F 16/583* (2019.01); *G06F 17/16* (2013.01); *G06F 40/20* (2020.01); *G06K 9/00234* (2013.01); *G06K 9/00288* (2013.01); *G06K 9/6215* (2013.01); *G06N 3/0454* (2013.01); *G06T 7/10* (2017.01)

(58) Field of Classification Search
CPC ............ G06K 9/00234; G06K 9/00288; G06F 17/16; G06T 7/10; G06N 3/0454
See application file for complete search history.

(56) References Cited

U.S. PATENT DOCUMENTS

| 8,571,332 | B2* | 10/2013 | Kumar | G06K 9/6269 382/224 |
| 2015/0125049 | A1* | 5/2015 | Taigman | G06T 15/205 382/118 |
| 2016/0307071 | A1* | 10/2016 | Perronnin | G06K 9/66 |
| 2019/0318156 | A1* | 10/2019 | Wu | G06T 7/80 |
| 2019/0347388 | A1* | 11/2019 | Jiang | G06K 9/6273 |

* cited by examiner

*Primary Examiner* — Ruiping Li
(74) *Attorney, Agent, or Firm* — Buckert Patent & Trademark Law Firm PC; John F. Buckert

(57) ABSTRACT

A computer vision neural network system is provided. The computer vision neural network system includes a computer with a multi-attribute loss module that concatenates first and second normalized feature vector descriptors to generate a master feature vector descriptor that describes attributes and classes of a facial image. The multi-attribute loss module estimates an error distance between the master feature vector descriptor and a plurality of class center vector descriptors. Each class center vector descriptor is a mean of a plurality of master feature vector descriptors associated with a soft-biometric class in a plurality of faces in a plurality of facial images.

10 Claims, 10 Drawing Sheets

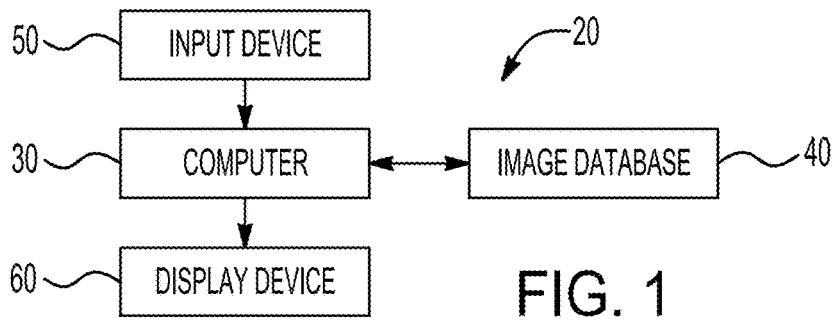

FIG. 1

```
                                                                    ┌─200
FACIAL SEGMENTATION MODULE RECEIVES A FACIAL IMAGE AND PREDICTS A
BACKGROUND REGION, A HAIR REGION, A FACE-SKIN REGION, AN EYES REGION, AN EYEBROWS REGION,
A LIPS REGION, AND A NOSE REGION IN THE FACIAL IMAGE
```

```
                                                                    ┌─202
FACIAL SEGMENTATION MODULE GENERATES A BACKGROUND MASK, A HAIR MASK, A FACE-SKIN MASK,
AN EYES MASK, AN EYEBROWS MASK, A LIPS MASK, AND A NOSE MASK BASED ON THE
BACKGROUND REGION, THE HAIR REGION, THE FACE-SKIN REGION, THE EYES REGION, THE EYEBROWS
REGION, AND THE LIPS REGION, RESPECTIVELY
```

```
                                                                    ┌─204
FACIAL SEGMENTATION MODULE SENDS THE BACKGROUND MASK, THE HAIR MASK, THE FACE-SKIN
MASK, THE EYES MASK, THE EYEBROWS MASK, THE LIPS MASK, AND THE NOSE MASK ASSOCIATED
WITH THE FACIAL IMAGE TO THE SEMANTIC SEGMENTATION MASKING MODULE
```

```
                                                                    ┌─206
FEATURE EXTRACTION NEURAL NETWORK RECEIVES THE FACIAL IMAGE
AND APPLIES A PLURALITY OF LEARNED FILTER BANKS TO THE FACIAL IMAGE TO GENERATE A
PLURALITY OF FEATURE MAPS ASSOCIATED WITH THE FACIAL IMAGE
```

```
                                                                    ┌─208
FEATURE EXTRACTION NEURAL NETWORK SENDS THE PLURALITY OF FEATURE MAPS ASSOCIATED WITH
THE FACIAL IMAGE TO THE SEMANTIC SEGMENTATION MASKING MODULE
```

```
                                                                    ┌─210
SEMANTIC SEGMENTATION MASKING MODULE APPLIES THE BACKGROUND MASK TO THE PLURALITY OF
FEATURE MAPS ASSOCIATED WITH THE FACIAL IMAGE TO OBTAIN A FIRST PLURALITY OF FEATURE
MAPS CORRESPONDING TO THE BACKGROUND REGION
```

```
                                                                    ┌─212
SEMANTIC SEGMENTATION MASKING MODULE APPLIES THE HAIR MASK TO THE PLURALITY OF
FEATURE MAPS ASSOCIATED WITH THE FACIAL IMAGE TO OBTAIN A SECOND PLURALITY OF FEATURE
MAPS CORRESPONDING TO THE HAIR REGION
```

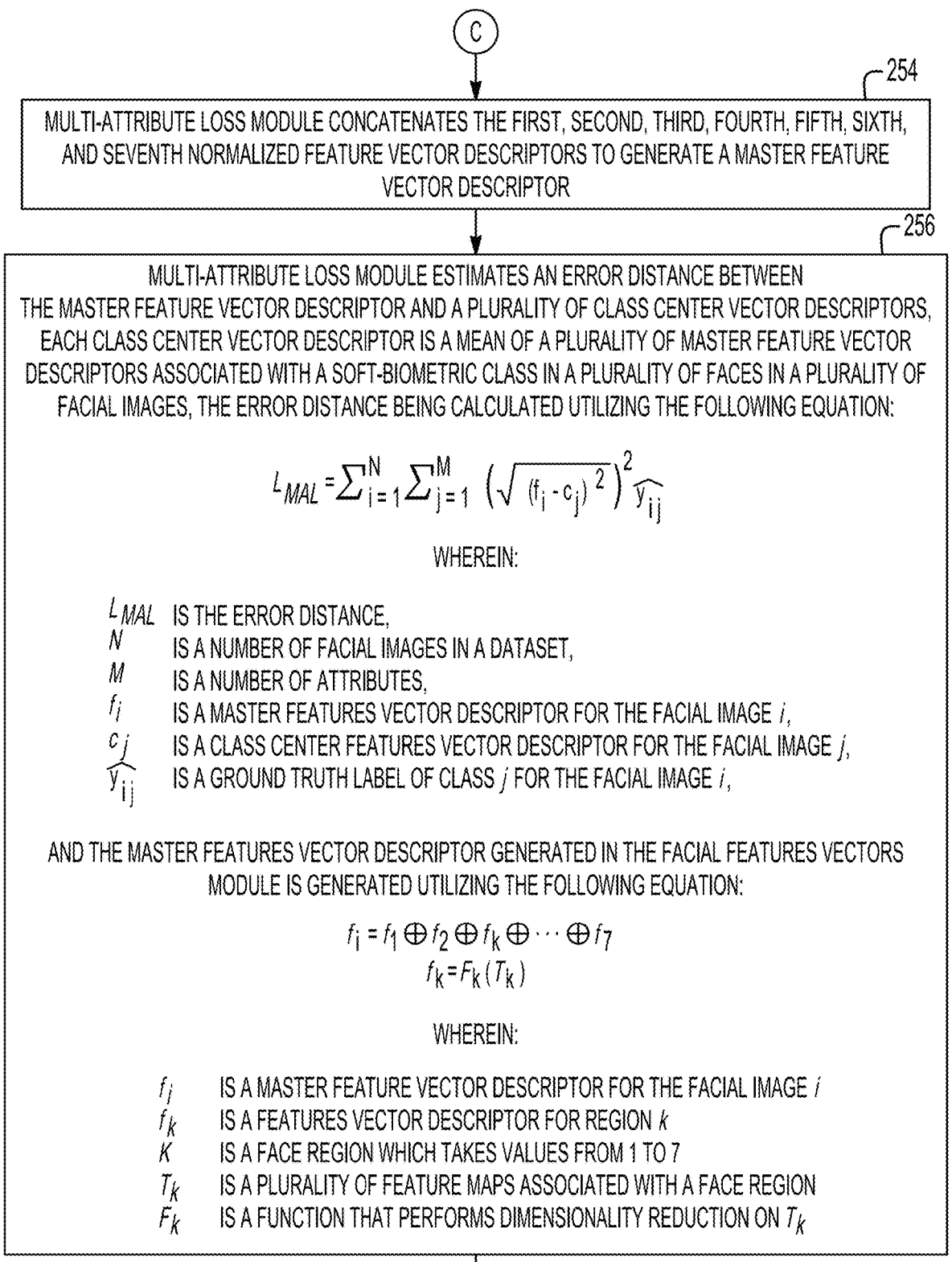

254 — MULTI-ATTRIBUTE LOSS MODULE CONCATENATES THE FIRST, SECOND, THIRD, FOURTH, FIFTH, SIXTH, AND SEVENTH NORMALIZED FEATURE VECTOR DESCRIPTORS TO GENERATE A MASTER FEATURE VECTOR DESCRIPTOR

256 — MULTI-ATTRIBUTE LOSS MODULE ESTIMATES AN ERROR DISTANCE BETWEEN THE MASTER FEATURE VECTOR DESCRIPTOR AND A PLURALITY OF CLASS CENTER VECTOR DESCRIPTORS, EACH CLASS CENTER VECTOR DESCRIPTOR IS A MEAN OF A PLURALITY OF MASTER FEATURE VECTOR DESCRIPTORS ASSOCIATED WITH A SOFT-BIOMETRIC CLASS IN A PLURALITY OF FACES IN A PLURALITY OF FACIAL IMAGES, THE ERROR DISTANCE BEING CALCULATED UTILIZING THE FOLLOWING EQUATION:

$$L_{MAL} = \sum_{i=1}^{N} \sum_{j=1}^{M} \left( \sqrt{(f_i - c_j)^2} \right)^2 \widehat{y_{ij}}$$

WHEREIN:

$L_{MAL}$ IS THE ERROR DISTANCE,
$N$ IS A NUMBER OF FACIAL IMAGES IN A DATASET,
$M$ IS A NUMBER OF ATTRIBUTES,
$f_i$ IS A MASTER FEATURES VECTOR DESCRIPTOR FOR THE FACIAL IMAGE $i$,
$c_j$ IS A CLASS CENTER FEATURES VECTOR DESCRIPTOR FOR THE FACIAL IMAGE $j$,
$\widehat{y_{ij}}$ IS A GROUND TRUTH LABEL OF CLASS $j$ FOR THE FACIAL IMAGE $i$, AND THE MASTER FEATURES VECTOR DESCRIPTOR GENERATED IN THE FACIAL FEATURES VECTORS MODULE IS GENERATED UTILIZING THE FOLLOWING EQUATION:

$$f_i = f_1 \oplus f_2 \oplus f_k \oplus \cdots \oplus f_7$$
$$f_k = F_k(T_k)$$

WHEREIN:

$f_i$ IS A MASTER FEATURE VECTOR DESCRIPTOR FOR THE FACIAL IMAGE $i$
$f_k$ IS A FEATURES VECTOR DESCRIPTOR FOR REGION $k$
$K$ IS A FACE REGION WHICH TAKES VALUES FROM 1 TO 7
$T_k$ IS A PLURALITY OF FEATURE MAPS ASSOCIATED WITH A FACE REGION
$F_k$ IS A FUNCTION THAT PERFORMS DIMENSIONALITY REDUCTION ON $T_k$

FIG. 5

COMPUTER VISION NEURAL NETWORK SYSTEM

CROSS-REFERENCE TO RELATED APPLICATIONS

This application claims priority to U.S. Provisional Patent Application No. 62/729,194 filed on Sep. 10, 2018, the entire contents of which are hereby incorporated by reference herein.

BACKGROUND

For identifying a similarity of a facial image to a textual description or another facial image, the inventors herein utilize a master feature vector descriptor which is an encoding of the attributes and features present in the facial image.

The inventors herein have conceived determining an improved error distance value utilizing a multi-attribute loss module. As a result, the error distance is back-propagated through neural networks in a computer vision neural network system to update weight values in the neural networks to improve the accuracy of an encoding/determination of a master feature vector descriptor.

SUMMARY

A computer vision neural network system in accordance with an exemplary embodiment is provided. The computer vision neural network system includes a computer having a facial segmentation module, a feature extraction module, a semantic segmentation masking module, a facial features vectors module, a normalization module, and a multi-attribute loss module. The facial segmentation module receives a facial image and predicts a plurality of facial regions in the facial image. The facial segmentation module generates a plurality of masks based on the plurality of facial regions. Each mask of the plurality of masks is associated with a respective facial region of the plurality of facial regions. The feature extraction neural network receives the facial image having the face therein, and applies a plurality of learned filter banks to the facial image to generate a plurality of feature maps. The semantic segmentation masking module applies each mask of the plurality of masks to the plurality of feature maps to obtain at least a first plurality of feature maps corresponding to a first facial region, and a second plurality of feature maps corresponding to a second facial region. The plurality of facial regions include the first and second facial regions. The facial features vectors module has at least first and second neural networks that receive the first and second plurality of feature maps, respectively, from the semantic segmentation masking module. The first neural network performing dimensionality reduction of the first plurality of feature maps associated with the first facial region to generate a first feature vector descriptor associated with the first facial region. The second neural network performing dimensionality reduction of the second plurality of feature maps associated with the second facial region to generate a second feature vector descriptor associated with the second facial region. The normalization module normalizes the first and second vector descriptors to generate first and second normalized feature vector descriptors. The multi-attribute loss module concatenates the first and second normalized feature vector descriptors to generate a master feature vector descriptor. The multi-attribute loss module estimates an error distance between the master feature vector descriptor and a plurality of class center vector descriptors. Each class center vector descriptor is a mean of a plurality of master feature vector descriptors associated with a soft-biometric class in a plurality of faces in a plurality of facial images.

BRIEF DESCRIPTION OF THE DRAWINGS

FIG. 1 is a schematic of a computer vision neural network system 20 in accordance with an exemplary embodiment;

FIGS. 2-6 are flowcharts of a method for determining an error distance utilizing a multi-attribute loss module between a master feature vector descriptor and a plurality of class center vector descriptors, utilizing the computer vision neural network system 20 of FIG. 1;

DETAILED DESCRIPTION

Figure 3:
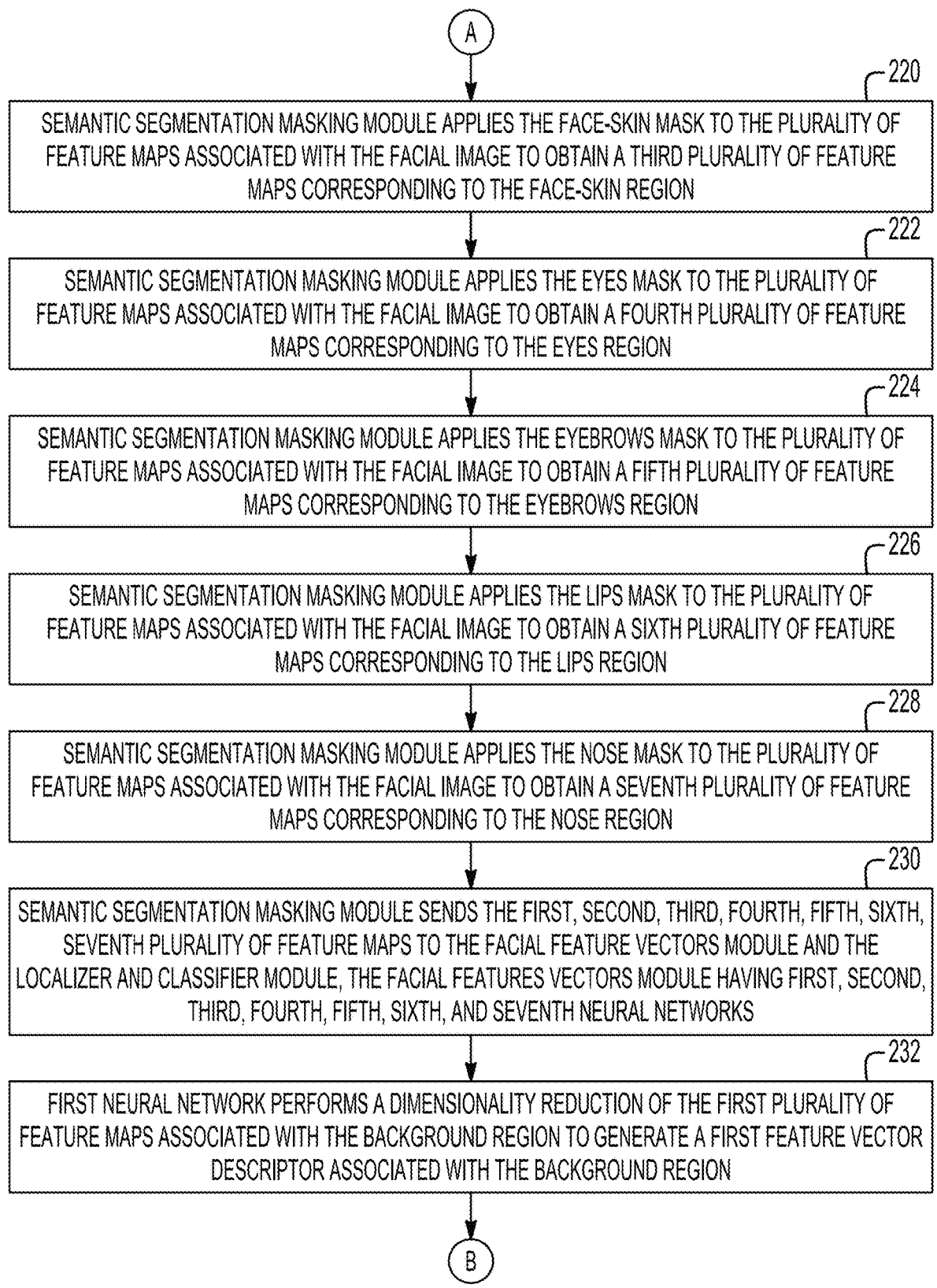
Figure 4:
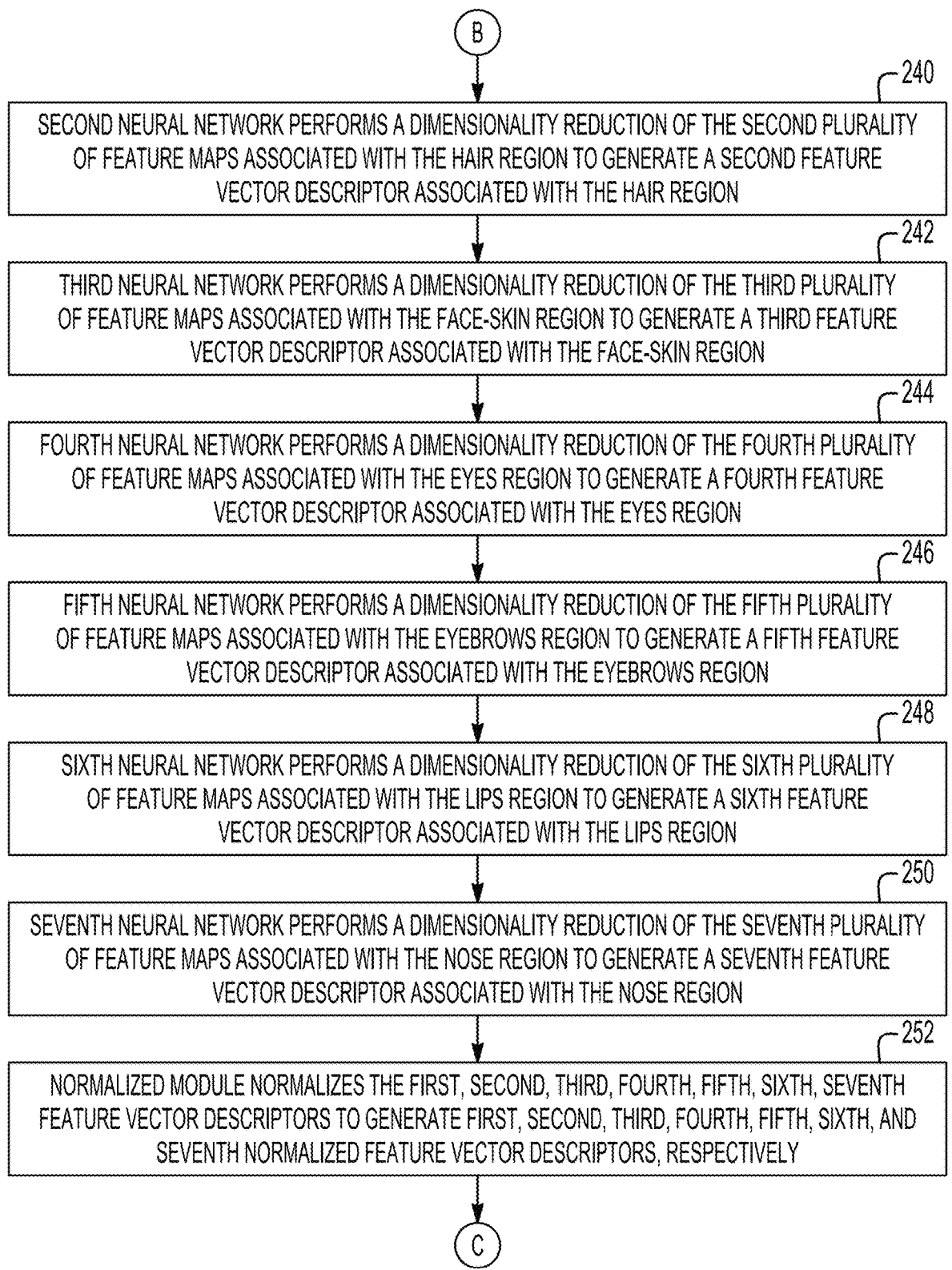
Figure 6:
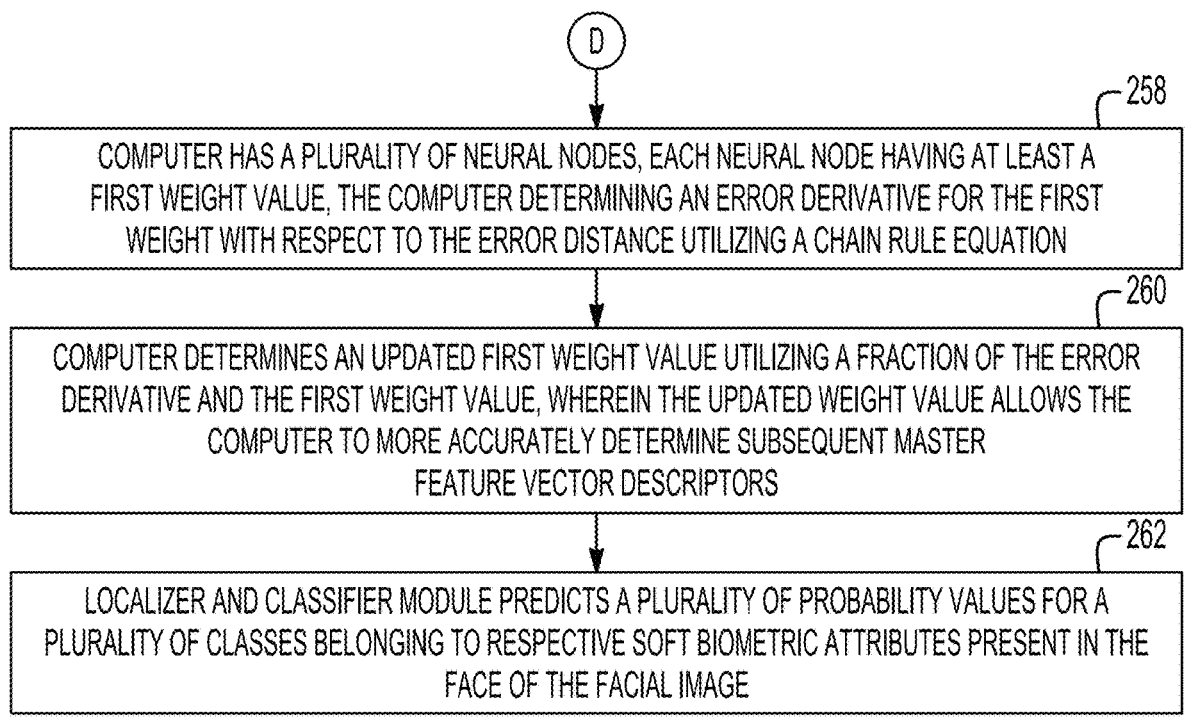
Figure 7:
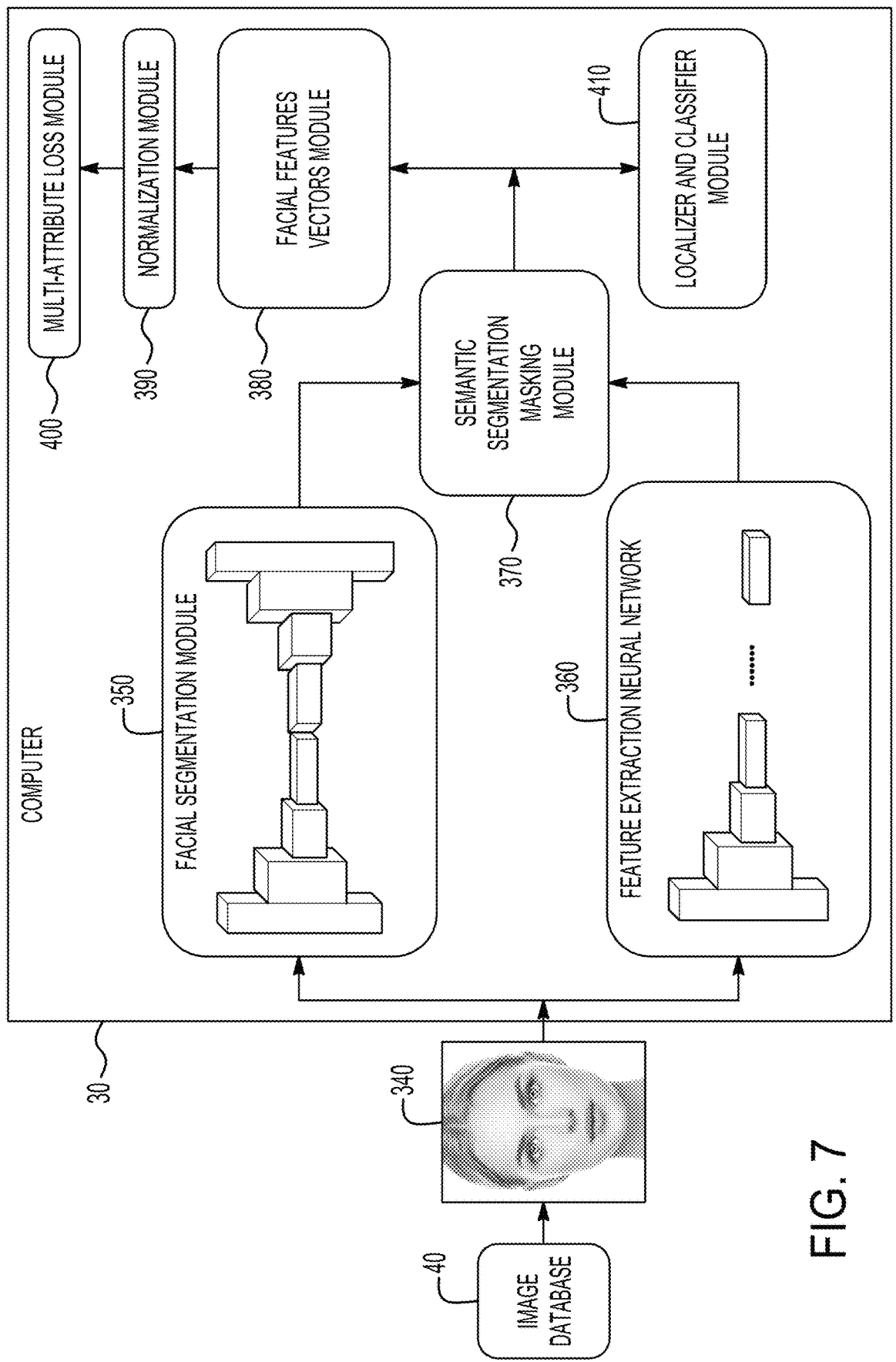
FIG. 7 is a block diagram of modules and neural networks utilized by the computer vision neural network system 20 of FIG. 1 including a facial segmentation module, a feature extraction neural network, a semantic segmentation masking module, a facial features vectors module, a normalization module, a multi-attribute loss module, and a localizer and classifier module

Referring to FIGS. 1 and 7, a computer vision neural network system 20 in accordance with an exemplary embodiment is provided. The computer vision neural network system 20 includes a computer 30, an image database 40, an input device 50, and a display device 60.

The computer 30 is operably coupled to the input device 50, the display device 60, and image database 40. The computer 30 includes a facial segmentation module 350, a feature extraction neural network 360, a semantic segmentation masking module 370, a facial features vectors module 380, a normalization module 390, a multi-attribute loss module 400, and a localizer and classifier module 410.

The input device 50 is provided to receive user selections for controlling operation of the computer 30. The display device 60 is provided to display images in response to instructions received from the computer 30. The image database 40 is provided to store a plurality of facial images therein.

An advantage of the computer vision neural network system 20 is that the system 20 determines an error distance utilizing a novel multi-attribute loss function. As a result, the system 20 can utilize the error distance to update weighting values in neural nodes in neural networks in the system 20 to more accurately determine master feature vector descriptors that describe the attributes and features in facial images.

For purposes of understanding, a few technical terms used herein will now be explained.

The term "dimensionality reduction" is a process of reducing the number of random variables under consideration, by obtain a set of principle variables.

The term "feature" is a recognizable pattern that is consistently present in a facial image. An exemplary feature is a hair style.

The term "attribute" is an aggregate of a set of features determined by a plurality of features in a facial image. An exemplary attribute is hair.

The term "class" is a subset or value of an attribute. An exemplary soft-biometric class is black hair.

Referring to FIGS. 2-7, a flowchart of a method for determining an error distance utilizing the multi-attribute loss module 400 between a master feature vector descriptor and a plurality of class center sector descriptors, utilizing the computer vision neural network system 20 will now be explained.

At step 200, the facial segmentation module 350 (shown in FIG. 7) receives a facial image 340 (shown in FIG. 7) and predicts a background region, a hair region, a face-skin region, an eyes region, an eyebrows region, a lips region, and a nose region in the facial image 340. After step 200, the method advances to step 202.

Figure 9:
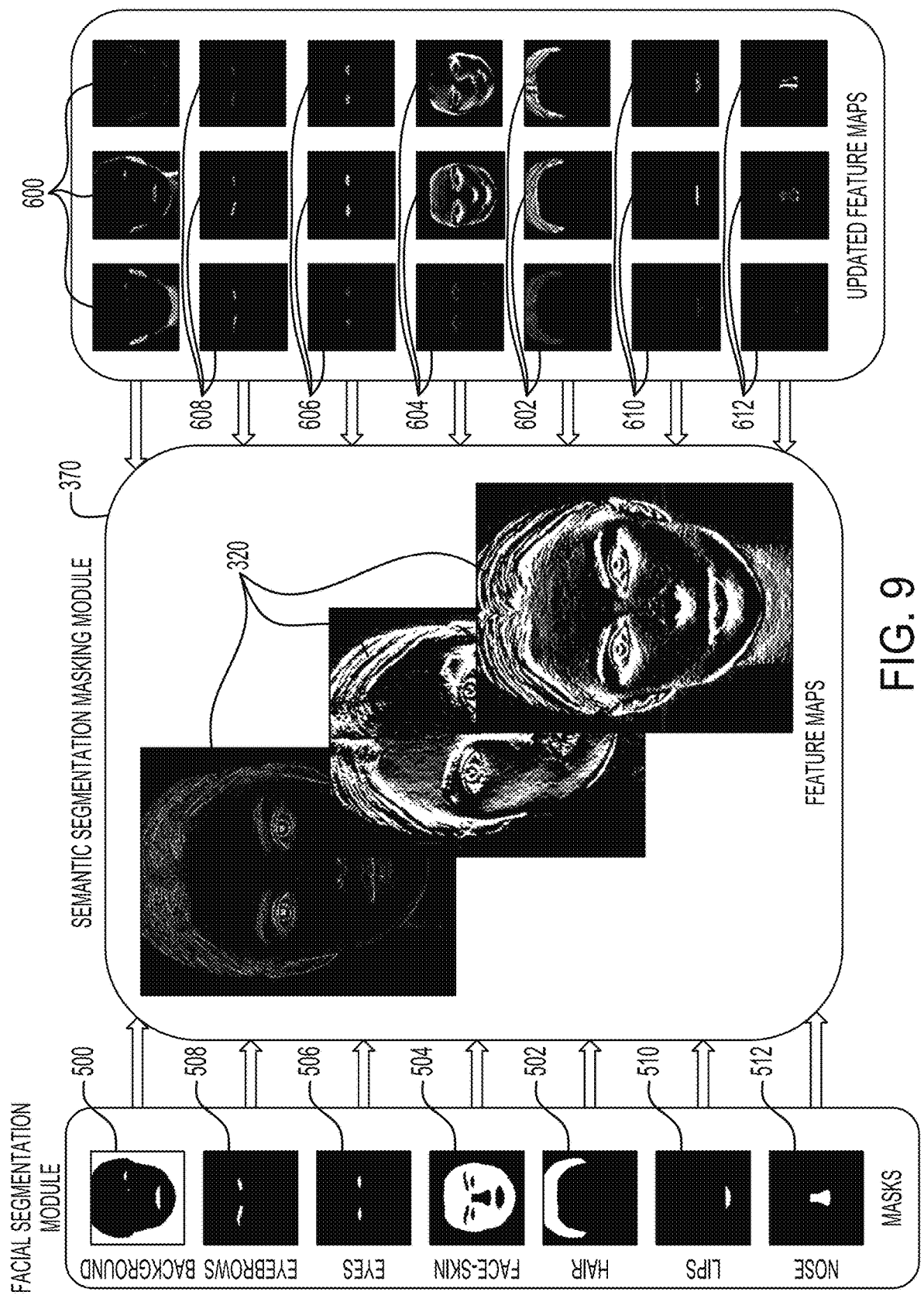
FIG. 9 is a block diagram of a facial segmentation module that generates a plurality of masks based on a plurality of facial regions in a facial image, and a semantic segmentation masking module that applies each mask of the plurality of masks to a plurality of feature maps to obtain updated feature maps.

At step 202, the facial segmentation module 350 generates a background mask 500 (shown in FIG. 9), a hair mask 502, a face-skin mask 504, an eyes mask 506, an eyebrows mask 508, a lips mask 510, and a nose mask 512 based on the background region, the hair region, the face-skin region, the eyes region, the eyebrows region, the lips region, respectively. After step 202, the method advances to step 204.

At step 204, the facial segmentation module 350 sends the background mask 500, the hair mask 502, the face-skin mask 504, the eyes mask 506, the eyebrows mask 508, the lips mask 510, and the nose mask 512 associated with the facial image 340 to the semantic segmentation masking module 370 (shown in FIG. 7). After step 204, the method advances the step 206.

Figure 8:
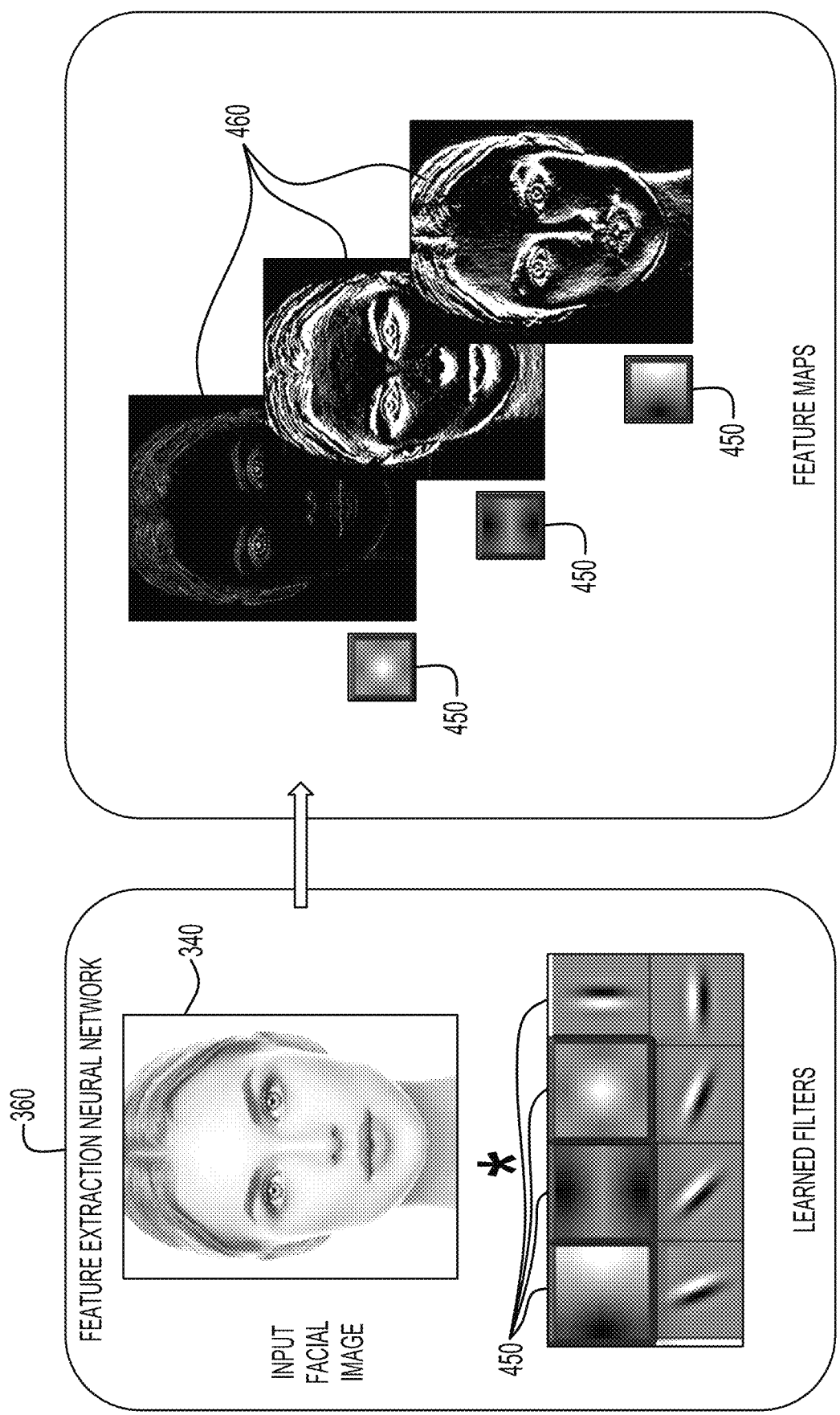
FIG. 8 is a block diagram of a feature extraction neural network that generates a plurality of feature maps associated with a facial image.

At step 206, the feature extraction neural network 360 (shown in FIG. 8) receives the facial image 340, and applies a plurality of learned filter banks 450 (shown in FIG. 8) to the facial image 340 to generate a plurality of feature maps 460 associated with the facial image 340. After step 206, the method advances to step 208.

At step 208, the feature extraction neural network 360 sends the plurality of feature maps 460 associated with the facial image 340 to the semantic segmentation masking module 370 (shown in FIG. 7). After step 208, the method advances to step 210.

At step 210, the semantic segmentation masking module 370 applies the background mask 500 (shown in FIG. 9) to the plurality of feature maps 460 (shown in FIG. 9) associated with the facial image 340 to obtain a first plurality of feature maps 600 (shown in FIG. 9) corresponding to the background region. After step 210, the method advances to step 212.

At step 212, the semantic segmentation masking module 370 applies the hair mask 502 (shown in FIG. 9) to the plurality of feature maps 460 (shown in FIG. 9) associated with the facial image 340 to obtain a second plurality of feature maps 602 (shown in FIG. 9) corresponding to the hair region. After step 212, the method advances to step 220.

At step 220, the semantic segmentation masking module 370 applies the face-skin mask 504 (shown in FIG. 9) to the plurality of feature maps 460 (shown in FIG. 9) associated with the facial image 340 to obtain a third plurality of feature maps 604 (shown in FIG. 9) corresponding to the face-skin region. After step 220, the method advances to step 222.

At step 222, the semantic segmentation masking module 370 applies the eyes mask 506 (shown in FIG. 9) to the plurality of feature maps 460 (shown in FIG. 9) associated with the facial image 340 to obtain a fourth plurality of feature maps 606 (shown in FIG. 9) corresponding to the eyes region. After step 222, the method advances to step 224.

At step 224, the semantic segmentation masking module 370 applies the eyebrows mask 508 (shown in FIG. 9) to the plurality of feature maps 460 (shown in FIG. 9) associated with the facial image 340 to obtain a fifth plurality of feature maps 608 (shown in FIG. 9) corresponding to the eyebrows region. After step 224, the method advances to step 226.

At step 226, the semantic segmentation masking module 370 applies the lips mask 510 (shown in FIG. 9) to the plurality of feature maps 460 associated with the facial image 340 to obtain a sixth plurality of feature maps 610 (shown in FIG. 9) corresponding to the lips region. After step 226, the method advances to step 228.

At step 228, the semantic segmentation masking module 370 applies the nose mask 512 (shown in FIG. 9) to the plurality of feature maps 460 (shown in FIG. 9) associated with the facial image 340 to obtain a seventh plurality of feature maps 612 (shown in FIG. 9) corresponding to the nose region. After step 228, the method advances to step 230.

At step 230, the semantic segmentation masking module 370 (shown in FIGS. 7 and 9) sends the first, second, third, fourth, fifth, sixth, and seventh plurality of feature maps 600, 602, 604, 606, 608, 610, 612 to the facial feature vectors module 380 (shown in FIG. 7) and the localizer and classifier module 410 (shown in FIG. 7). In an exemplary embodiment, each of the first, second, third, fourth, fifth, sixth, and seventh plurality of feature maps 600, 602, 604, 606, 608, 610, 612 include 78 feature maps with a height of 7 and a width of 6. The facial features vectors module 380 has first, second, third, fourth, fifth, sixth, and seventh neural networks 700, 702, 704, 706, 708, 710, 712 (shown in FIG. 10). After step 230, the method advances the step 232.

At step 232, the first neural network 700 (shown in FIG. 10) performs a dimensionality reduction of the first plurality of feature maps 600 (shown in FIG. 10) associated with the background region to generate a first feature vector descriptor 750 (shown in FIG. 10) associated with the background region. After step 232, the method advances to step 240.

At step 240, the second neural network 702 (shown in FIG. 10) performs a dimensionality reduction of the second plurality of feature maps 602 (shown in FIG. 10) associated with the hair region to generate a second feature vector descriptor 752 (shown in FIG. 10) associated with the hair region. After step 240, the method advances to step 242.

At step 242, the third neural network 704 (shown in FIG. 10) performs a dimensionality reduction of the third plurality of feature maps 604 (shown in FIG. 10) associated with the face-skin region to generate a third feature vector descriptor 754 (shown in FIG. 10) associated with the face-skin region. After step 242, the method advances to step 244.

At step 244, the fourth neural network 706 (shown in FIG. 10) performs a dimensionality reduction of the fourth plurality of feature maps 606 (shown in FIG. 10) associated with the eyes region to generate a fourth feature vector descriptor 756 (shown in FIG. 10) associated with the eyes region. After step 244, the method advances to step 246.

At step 246, the fifth neural network 708 (shown in FIG. 10) performs a dimensionality reduction of the fifth plurality of feature maps 608 (shown in FIG. 10) associated with the eyebrows region to generate a fifth feature vector descriptor 758 (shown in FIG. 10) associated with the eyebrows region. After step 246, the method advances to step 248.

At step 248, the sixth neural network 710 (shown in FIG. 10) performs a dimensionality reduction of the sixth plurality of feature maps 610 (shown in FIG. 10) associated with the lips region to generate a sixth feature vector descriptor 760 (shown in FIG. 10) associated with the lips region. After step 248, the method advances to step 250.

At step 250, the seventh neural network 712 (shown in FIG. 10) performs a dimensionality reduction of the seventh plurality of feature maps 612 (shown in FIG. 10) associated with the nose region to generate a seventh feature vector descriptor 762 (shown in FIG. 10) associated with the nose region. After step 250, the method advances to step 252.

Figure 10:
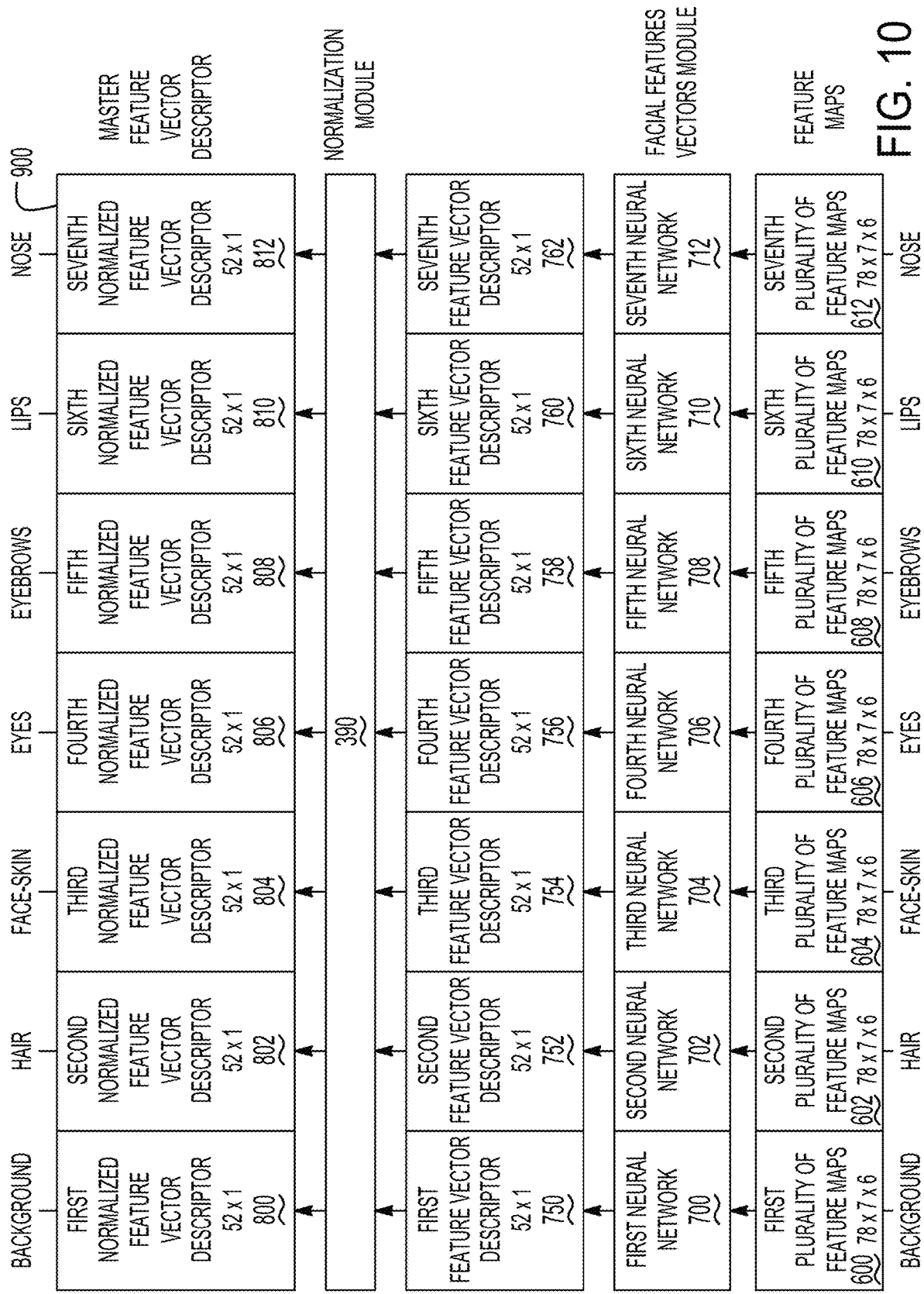
FIG. 10 is a block diagram of the plurality feature maps, the facial features vectors module, the normalization module, and a master feature vector descriptor associated with the facial image.

At step 252, the normalization module 390 normalizes the first, second, third, fourth, fifth, sixth, and seventh feature vector descriptors 750, 752, 754, 756, 758, 760, 762 to generate first, second, third, fourth, fifth, sixth, and seventh normalized feature vector descriptors 800, 802, 804, 806, 808, 810, 812, respectively (shown in FIG. 10). After step 252, the method advances to step 254.

At step 254, the multi-attribute loss module 400 concatenates the first, second, third, fourth, fifth, sixth, and seventh normalized feature vector descriptors 800, 802, 804, 806, 808, 810, 812 to generate a master feature vector descriptor 900 (shown in FIG. 10). In an exemplary embodiment, each of the first, second, third, fourth, fifth, sixth, and seventh normalized feature vector descriptors 800, 802, 804, 806, 808, 810, 812 is a vector with a dimension of 52. After step 254, the method advances to step 256.

At step 256, the multi-attribute loss module 400 estimates an error distance between the master feature vector descriptor 900 and a plurality of class center vector descriptors. Each class center vector descriptor is a mean of a plurality of master feature vector descriptors associated with a soft-biometric class in a plurality of faces in a plurality of facial images. The error distance is calculated utilizing the following equation:

$$L_{MAL} = \Sigma_{i=1}^{N} \Sigma_{j=1}^{M} (\sqrt{(f_i - c_j)^2}) \vec{y}_{si}$$

wherein:
$L_{MAL}$ is the error distance,
N is a number of images in a dataset,
M is a number of attributes,
$f_i$ a master features vector descriptor for the facial image i,
$c_j$ a class center features vector descriptor for the facial image j,
$\vec{y}_{si}$ a ground truth label of class I for the facial image i, and the master features vector descriptor generated in the facial features vectors module is generated utilizing the following equation:

$$f_i = f_1 \oplus f_2 \oplus f_k \oplus \ldots \oplus f_7$$

$$f_k = F_k(T_k)$$

wherein:
$f_i$ is a master feature vector descriptor for the facial image
$f_k$ is a features vector descriptor for region k
k is a face region which takes values from 1 to 7
$T_k$ is a plurality of feature maps associated with a face region
$F_k$ is a function that performs dimensionality reduction on $T_k$.

At step 258, the computer 30 has a plurality of neural nodes. Each neural node has at least a first weight value. The computer 30 determines an error derivative for the first weight with respect to the error distance utilizing a chain rule equation. After step 258, the method advances to step 260.

At step 260, the computer 30 determines an updated first weight value utilizing a fraction of the error derivative and the first weight value, wherein the updated weight value allows the computer 30 to more accurately determine subsequent master feature vector descriptors. After step 260, the method advances to step 262.

At step 262, the localizer and classifier module 410 predicts a plurality of probability values for a plurality of classes belonging to respective soft biometric attributes present in the face of the facial image 340.

Figure 11:
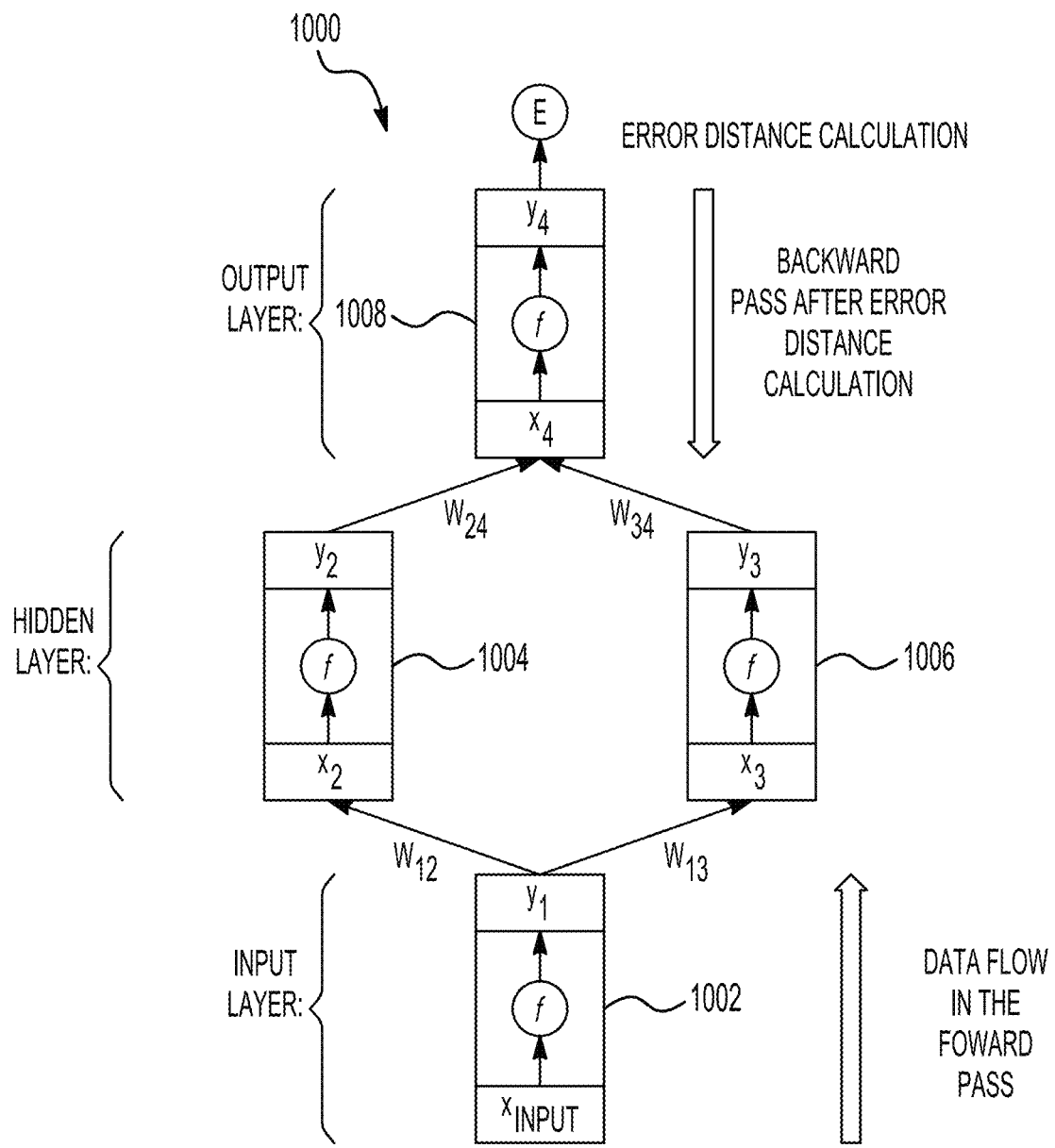
FIG. 11 is a block diagram of an exemplary neural network.

Referring to FIG. 11, for purposes of understanding, an overview the process for updating weight values in a neural network 1000 to obtain more accurate master feature vector descriptors will be explained. The neural network 1000 is a simplified version of a neural network in the system 20 that is utilized in part to determine a master feature vector descriptor describing attributes in a facial image.

The backpropagation process takes place in a backward pass and is complementary to a forward pass. The process for updating weight values in a neural network 1000 includes the following steps (i), the forward pass, (ii) calculating the error distance, (iii) calculating the error derivative at each neural node, and (iv) updating the weight values with the error derivative.

The forward pass involves the processing of the input data by passing it through a series of computations. The results or prediction of the neural network 1000 is calculated at the end of the forward pass.

The error distance is calculated utilizing the equation in step 256 discussed above.

The neural network 1000 includes an input layer, one hidden layer, and an output layer. The input layer includes a neural node 1002. The hidden layer includes neural nodes 1004, 1006 having weight values $W_{12}$, $W_{13}$, respectively. The output layer includes a neural node 1008 having weight values $W_{24}$, $W_{34}$.

Each layer performs the following computation:

$$y_j = f(x_j)$$

$$x_j = W_{ij} y_i + B_{ij}$$

Where,
$y_j$ is an output of the neural node r.
f is a non-linear function also called the activation function. For this example, a sigmoid activation function will be used:

$$f(x) = \frac{1}{1 + e^{-x}}$$

$x_j$ is an output of the neural node j
$W_{ij}$ is the weight value term of the neural node j that is applied to the output of neural node i
$y_i$ is the output of the neural node i
$y_j$ is an output of the neural node j
$B_{ij}$ is a bias term of the neural node j that is applied to the output of neural node i.

The error derivative or the gradient of the loss function at each neural node is calculated by using the chain rule of differential equations. The chain rule allows the system 20 to determine the error derivative for a weight value $w_{ij}$ with respect to the error distance E. The chain rule is explained as follows:

Consider two functions Z and M for some input such that:

$$Z = f(M)$$

$$M = f(x)$$

The derivative $$\frac{dZ}{dx}$$

could be calculated by the chain rule as follows:

$$\frac{dZ}{dx} = \frac{dM}{dx}\frac{dZ}{dM}$$

With respect to the backpropagation diagram shown in FIG. 11, the system 20 calculates the error derivative for $x_4$ with respect to the error distance as follows:

$$\frac{\partial E}{\partial x_4} = \frac{\partial y_4}{\partial x_4}\frac{\partial E}{\partial y_4}$$

Once the error derivatives are calculated the weight values are updated by the following rule:

$$w_{ij} = w_{ij} - \lambda \frac{\partial E}{\partial w_{ij}}$$

where
E is an error distance calculated by the loss function
$w_{ij}$ are weight/parameter values between neural nodes i and j
$\lambda$ is a learning rate $$\frac{\partial E}{\partial w_{ij}}$$

is an error derivative/gradient of weight values $w_{ij}$ with respect to the error distance E.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A computer vision neural network system, comprising:
a computer having a facial segmentation module, a feature extraction module, a semantic segmentation masking module, a facial features vectors module, a normalization module, and a multi-attribute loss module;
the facial segmentation module receiving a facial image and predicting a plurality of facial regions in the facial image;
the facial segmentation module generating a plurality of masks based on the plurality of facial regions, each mask of the plurality of masks being associated with a respective facial region of the plurality of facial regions;
the feature extraction neural network receiving the facial image having the face therein, and applying a plurality of learned filter banks to the facial image to generate a plurality of feature maps;
the semantic segmentation masking module applying each mask of the plurality of masks to the plurality of feature maps to obtain at least a first plurality of feature maps corresponding to a first facial region, and a second plurality of feature maps corresponding to a second facial region, the plurality of facial regions including the first and second facial regions;
the facial features vectors module having at least first and second neural networks that receive the first and second plurality of feature maps, respectively, from the semantic segmentation masking module;
the first neural network performing dimensionality reduction of the first plurality of feature maps associated with the first facial region to generate a first feature vector descriptor associated with the first facial region;
the second neural network performing dimensionality reduction of the second plurality of feature maps associated with the second facial region to generate a second feature vector descriptor associated with the second facial region;
the normalization module normalizing the first and second vector descriptors to generate first and second normalized feature vector descriptors;
the multi-attribute loss module concatenating the first and second normalized feature vector descriptors to generate a master feature vector descriptor; and
the multi-attribute loss module estimating an error distance between the master feature vector descriptor and a plurality of class center vector descriptors, each class center vector descriptor is a mean of a plurality of master feature vector descriptors associated with a soft-biometric class in a plurality of faces in a plurality of facial images.

2. The computer vision neural network system of claim 1, wherein:
the plurality of facial regions include a background region, a hair region, a face-skin region, an eyes region, an eyebrows region, a lips region, and a nose region in the facial image.

3. The computer vision neural network system of claim 2, wherein:
the plurality of masks includes a background mask, a hair mask, a face-skin mask, an eyes mask, an eyebrows mask, a lips mask, and a nose mask; and
the facial segmentation module generating the background mask, the hair mask, the face-skin mask, the eyes mask, the eyebrows mask, the lips mask, and the nose mask based on the background region, the hair region, the face-skin region, the eyes region, the eyebrows region, the lips region, and the nose region, respectively.

4. The computer vision neural network system of claim 3, wherein:
the first facial region comprises the background region, and the second facial region comprises the hair region;

the semantic segmentation masking module applying the background mask to the plurality of feature maps to obtain the first plurality of feature maps corresponding to the background region;

the semantic segmentation masking module applying the hair mask to the plurality of feature maps to obtain the second plurality of feature maps corresponding to the hair region;

the semantic segmentation masking module applying the face-skin mask to the plurality of feature maps to obtain a third plurality of feature maps corresponding to the face-skin region;

the semantic segmentation masking module applying the eyes mask to the plurality of feature maps to obtain a fourth plurality of feature maps corresponding to the eyes region;

the semantic segmentation masking module applying the eyebrows mask to the plurality of feature maps to obtain a fifth plurality of feature maps corresponding to the eyebrows region;

the semantic segmentation masking module applying the lips mask to the plurality of feature maps to obtain a sixth plurality of feature maps corresponding to the lips region; and the semantic segmentation masking module applying the nose mask to the plurality of feature maps to obtain a seventh plurality of feature maps corresponding to the nose region.

5. The computer vision neural network system of claim 4, wherein:

the facial features vectors module further includes third, fourth, fifth, sixth, and seventh neural networks that receive the third, fourth, fifth, sixth, and seventh plurality of feature maps, respectively;

the first neural network performing dimensionality reduction of the first plurality of feature maps associated with the background region to generate a first feature vector descriptor associated with the background region;

the second neural network performing dimensionality reduction of the second plurality of feature maps associated with the hair region to generate a second feature vector descriptor associated with the hair region;

the third neural network performing dimensionality reduction of the third plurality of feature maps associated with the face-skin region to generate a third feature vector descriptor associated with the face-skin region;

the fourth neural network performing dimensionality reduction of the fourth plurality of feature maps associated with the eyes region to generate a fourth feature vector descriptor associated with the eyes region;

the fifth neural network performing dimensionality reduction of the fifth plurality of feature maps associated with the eyebrows region to generate a fifth feature vector descriptor associated with the eyebrows region;

the sixth neural network performing dimensionality reduction of the sixth plurality of feature maps associated with the lips region to generate a sixth feature vector descriptor associated with the lips region; and the seventh neural network performing dimensionality reduction of the seventh plurality of feature maps associated with the nose region to generate seventh feature vector descriptor associated with the nose region.

6. The computer vision neural network system of claim 5, wherein:

the normalization module normalizing the first and second feature vector descriptors and third, fourth, fifth, sixth, and seventh feature vector descriptors to generate the first and second normalized feature vector descriptors and third, fourth, fifth, sixth, and seventh normalized feature vector descriptors, respectively.

7. The computer vision neural network system of claim 6, wherein:

the multi-attribute loss module concatenates the first and second normalized feature vector descriptors and the third, fourth, fifth, sixth, and seventh normalized feature vector descriptors to generate the master feature vector descriptor.

8. The computer vision neural network system of claim 7, wherein:

the computer further includes a localizer and classifier module that receives the first, second, third, fourth, fifth, sixth and seventh plurality of feature maps from the semantic segmentation masking module; and the localizer and classifier module predicting a plurality of probability values for a plurality of classes belonging to respective soft biometric attributes present in the face of the facial image.

9. The computer vision neural network system of claim 1, wherein the multi-attribute loss module estimating the error distance utilizing the following equation:

$$L_{MAL} = \Sigma_{i=1}^{N} \Sigma_{j=1}^{M} (\sqrt{(f_i - c_j)^2}) \vec{y}_{ij}$$

wherein:
$L_{MAL}$ is the error distance,
N is a number of images in a dataset,
M is a number of attributes,
$f_i$ a master features vector descriptor for the facial image i,
$c_j$ a class center features vector descriptor for the facial image j,
$\vec{y}_{ij}$ a ground truth label of class j for the facial image i,
and the master features vector descriptor generated in the facial features vectors module is generated utilizing the following equation:

$$f_i = f_1 \oplus f_2 \oplus f_k \oplus \ldots \oplus f_7$$

$$f_k = F_k(T_k)$$

wherein:
$f_i$ is a master feature vector descriptor for the facial image i,
$f_k$ is a features vector descriptor for region k,
k is a face region which takes values from 1 to 7,
$T_k$ is a plurality of feature maps associated with a face region,
$F_k$ is a function that performs dimensionality reduction on $T_k$.

10. The computer vision neural network system of claim 1, wherein:

the computer having a plurality of neural units, each neural unit of the plurality of neural units having at least a first weight value;

the computer determining an error derivative for the first weight value with respect to the error distance utilizing a chain rule equation; and the computer determining an updated first weight value utilizing a fraction of the error derivative and the first weight value, wherein the updated weight value allows the computer vision neural network to more accurately determine the master feature vector descriptor.

* * * * *